March 17, 1953     A. T. HUTCHINSON     2,631,308
POWER PIPE THREADER
Filed June 8, 1949     2 SHEETS—SHEET 1
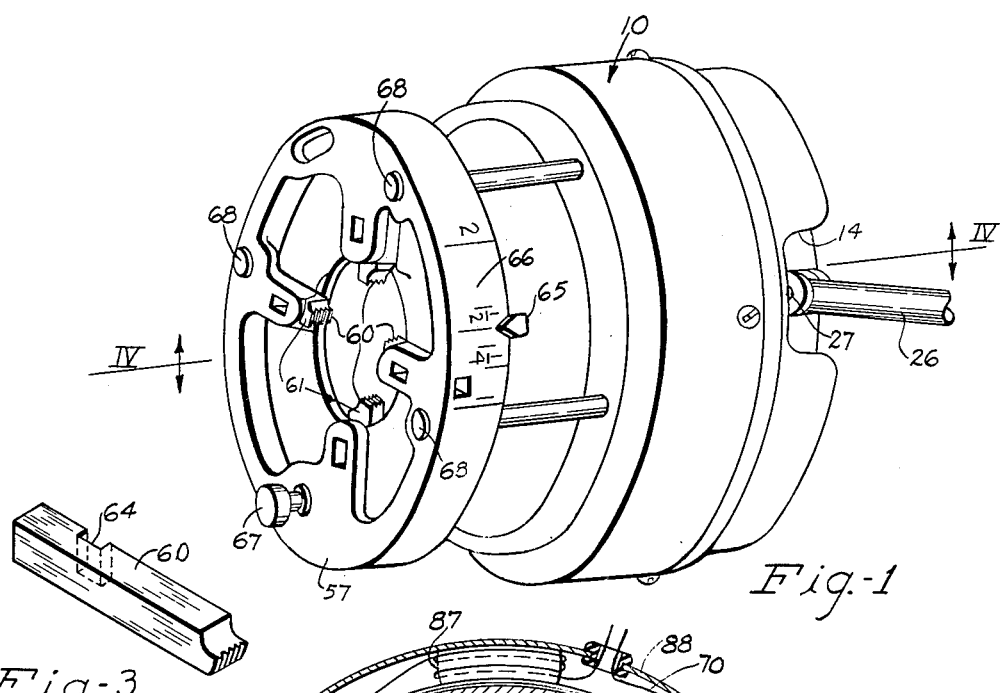
Fig.-1
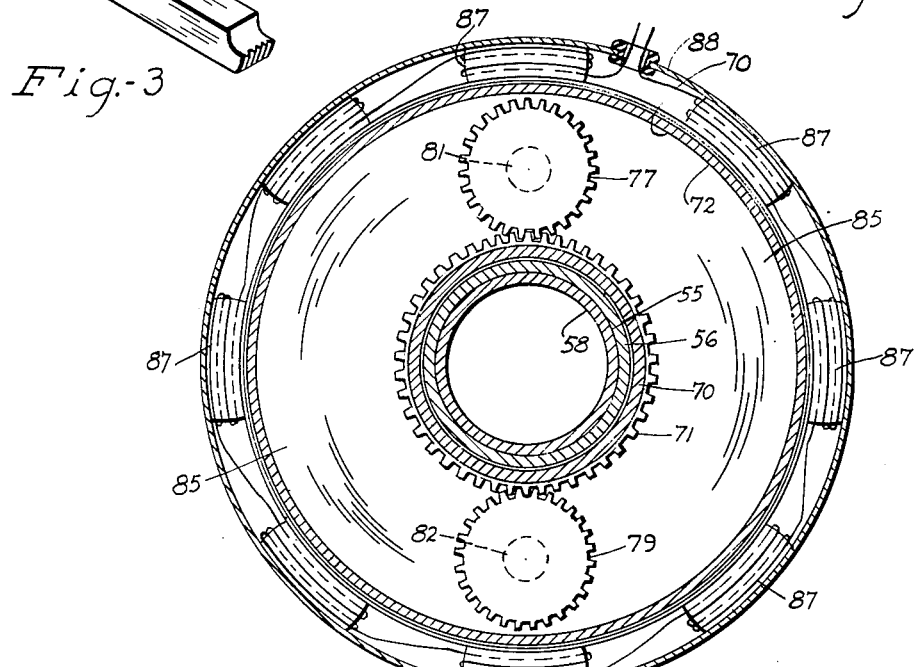
Fig.-3
Fig.-2
INVENTOR
ALFRED T. HUTCHINSON
BY Harry C. Lebuto
ATTORNEY

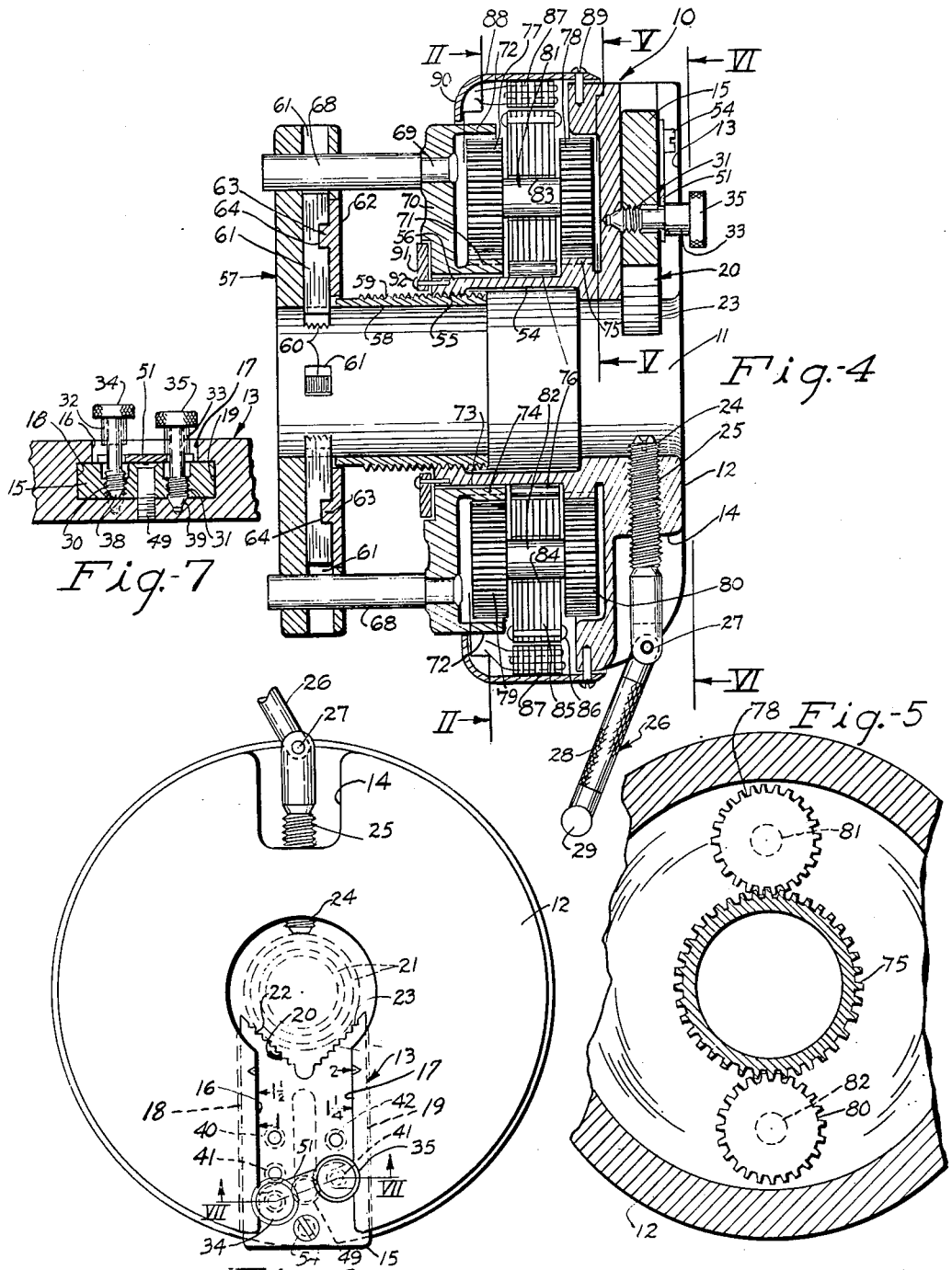

Patented Mar. 17, 1953

2,631,308

UNITED STATES PATENT OFFICE 2,631,308

POWER PIPE THREADER

Alfred T. Hutchinson, Hammond, Ind.

Application June 8, 1949, Serial No. 97,808

12 Claims. (Cl. 10—104)

This invention relates to pipe threaders and more particularly to portable pipe threading devices of the type illustrated and described in United States Letters Patent No. 2,374,176 issued April 24, 1945, to Ervin L. Cook, although certain features thereof may be employed with equal advantage for other purposes.

It contemplates more especially the provision of a simple, compact, light weight and highly portable self-contained power threader that has an improved built-in motor construction combined with a train of gears serving as an integrated power unit.

Numerous types of power threaders of the stationary and portable type have heretofore been proposed, but these are complicated in construction, involve a comparatively large number of moving parts, burdensome in weight to the mechanic, and are expensive in construction.

It should be observed that the manual cutting of threads on pipes up to one inch in diameter presents no problem, but beyond this diameter it usually requires two men to cut threads on pipes up to about two inches in diameter, while pipes of still larger diameter usually must be threaded at the factory where heavy duty stationary pipe threaders are available.

The teaching of the present invention concerns itself with the problem of cutting threads on pipes between one and two inches in diameter that involve substantially eleven and one-half threads per inch as a standard. While pipes within this range can be manually threaded by two men in the field, yet the problem of man power limits the practicability of manually cutting threads on pipes within this range. Then, too, the labor expense involved is appreciable and for that reason portable power pipe threaders possess a distinct advantage and serve a highly useful purpose in the field for cutting threads on pipes up to two inches in diameter.

The portable power threaders of the type illustrated and described in United States Letters Patent No. 2,374,176 have proven successful in practice; however, extraneous power units such as electric hand drills of the required capacity are not always available or conveniently at hand. Then, too, with the teaching of the present invention a self-contained and combined power and reduction gear unit is possible without appreciably increasing the weight of the device or the aggregate cost of a power threader without an electric hand drill heretofore suggested for use therewith. This results in a complete light weight self-contained power threader without requiring any appreciable enlargement of the housing or number of parts.

While specific pipe diameters have been referred to herein, these should be construed as illustrative rather than limitations upon the teachings of the invention which shall hereinafter be described in detail.

One object of the present invention is to simplify the construction and improve the operation of devices of the character mentioned.

Another object is to provide improved self-contained power pipe threading devices that are simple, compact, light weight and highly portable for use in the field.

Still another object is to provide a simple, inexpensive and light weight pipe threader that is power operated by a built-in simple and effective combined motor and train of gears.

A further object is to provide a simple and inexpensive power pipe threader that embodies a simple power gear drive comprising an intimate part of the reduction gearing to impart a high power factor thereto.

A still further object is to provide a portable power pipe threader embodying a simple, effective and inexpensive train of reduction gears having a motor combined with spur pinions and a driven spur gear with a simple built-in intermediate gear arrangement.

Still a further object is to provide a portable pipe threader embodying a simple train of comparatively few gears arranged compactly to provide a driver motor and a driven ring gear with a simple train of intermeshing elements combined therewith.

Other objects and advantages will appear from the following description of an illustrated embodiment of the present invention.

In the drawings:

Figure 1 is a perspective view of a device embodying features of the present invention.

Figure 2 is a sectional view in elevation taken along line II—II of Figure 4.

Figure 3 is a perspective view of a simple thread cutting chaser.

Figure 4 is a sectional side view in elevation taken substantially along line IV—IV of Figure 1.

Figure 5 is a fragmentary sectional view in elevation taken along line V—V of Figure 4.

Figure 6 is a rear view in elevation taken substantially along line VI—VI of Figure 4.

Figure 7 is a sectional view taken substantially along line VII—VII of Figure 6.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises a substantially circular body or housing 10 cast or otherwise shaped to provide an axial bore 11 somewhat larger than the maximum diameter of a pipe to be threaded in a manner to be hereinafter described. The circular body or housing 10 has a circular end cap 12 formed on one end thereof to encircle the bore 11 and provide a radially disposed guide block extension 13. The end cap 12 has a radial opening 14 in alignment with the guide block 13 to provide a boss for pipe clamping instrumentalities as will appear more fully hereinafter.

In order to securely clamp a pipe in the bore 11, a flat rigid jaw plate 15 of hardened steel is fitted for slidable displacement in confronting complemental guide grooves 16—17 provided in the parallel walls 18—19, respectively, of the guide block extension 13 which is formed integral with the circular housing end cap 12.

As shown, the flat slidable plate 15 is provided at one end thereof with a substantially V-shaped jaw 20 (Figure 6) to centrally support circular pipe 21 of varying diameters within a predetermined range. To this end, the diverging walls of the substantially V-shaped jaw 20, are serrated as at 22—23 to exert an effective gripping engagement with the surface of pipe 21 which is wedged between these serrated jaw walls 22—23 as a two-point mount with another equidistantly extending and radially confronting jaw member 24 serving as the third of a three-point vise-gripping clamp on pipe 21 of varying diameter.

It should be noted that the jaw member 24 comprises, in this instance, a threaded jaw stud which engages a correspondingly threaded bore 25 provided radially through the circular housing end cap 12 which has an opening 14 therein along a longitudinal median line of the slidable confronting jaw 20. A stud extension 26 is pivotally connected as at 27 to the outer extremity of the jaw stud 24 to serve as a lever handle for the jaw stud 24.

To this end, the lever handle 26 is preferably knurled exteriorly as at 28 for effective manual grip and terminates in an enlarged spherical ball 29 to preclude the accidental displacement of the hand therefrom during the manipulation thereof. This lever handle 26 enables the turning engagement of the jaw stud 24 into forceful engagement with the pipe 21 that, in turn, is forced to engage the divergent serrated walls 22—23 of the preset slidable jaw 20.

The jaw plate 15 is operationally stationary, but it is slidable in the guide grooves 16—17. This enables the jaw 20 to be preset for any specific diameter pipe within a predetermined range so that the pipe 21 will be self-centered within the housing bore 11 for fixed engagement between the jaw engaging points 22—23—24. The pipe 21 is clamped responsive to turning the lever handle 26 to bring the jaw stud 24 with substantial pressure engagement against the pipe 21 and the latter's stationary jaw engaging surfaces 22—23.

In order to pre-set and index the position of the slidable jaw 20 for any specific diameter pipe 21 within the range for which the parts are proportioned, the jaw plate 15 is provided, in this instance, with two threaded apertures 30—31 extending therethrough (Figure 7) to receive correspondingly threaded enlarged stud shoulders 32—33 which have manual adjusting heads 34—35 extending from reduced annularly grooved necks 36—37.

The lower ends of the threaded stud shoulders 32—33 terminate in reduced jaw indexing extremities 38—39 which project in the path of a plurality of recesses 40—41 and 42—43, in this instance in pairs of two proximate to each slide jaw guide 16—17. The recesses 41—42 are provided in the bottom 44 of the guide block extension 13 in alignment and for registry with the indexing stud extremities 32—33. This affords the ready positioning of the slide jaw plate 15 in any one of four positions to correspond, in this instance, with the proper centering position of 1", 1¼", 1½", and 2" pipe, although the number of positions and the size limits will vary within a wide range depending upon the dictates of commercial practice.

The recesses 40—41 are in line with the index stud 34 for setting the plate 15 and its jaw 20 to engage a 1" and 1½" pipe 21, respectively, while recesses 42—43 are in line with the index stud 35 for setting the jaw plate 15 to engage a 1¼" and 2" pipe 21, respectively, so that the pipe 21 irrespective of diameter will be positioned centrally of the bore 11 within the housing 10—12. For a 1" and 1½" pipe setting, the stud 34 is utilized and for a 1¼" and 2" pipe setting, the stud 35 is placed in registry with the calibrations 45—46 on the jaw plate 15 being lined up with the notches 47—48 on the top ledges of the jaw guides 16—17, respectively.

It should be noted that the slidable displacement of the jaw plate 15 is limited in its extreme movement by a threaded screw 49 (Figure 7) which is threaded therethrough to project in an elongated slot 50 provided in the bottom 44 of the guide block extension 13. This precludes the jaw 20 from being accidentally removed from its guider 16—17. So that the jaw indexing studs 34—35 will not be accidentally removed from the threaded bores 30—31, a retainer plate 51 having open slotted ears 52—53 to engage the indexing stud annular grooves 36—37 for retention thereof against displacement relative to the jaw plate 15. To this end, the retainer plate 51 is attached to the jaw plate 15 by means of a threaded stud 54 proximate to one edge 55 thereof.

There is sufficient clearance between the depth of the indexing stud grooves 36—37 and the comparatively thinner retainer plate 51 to permit the indexing studs 34—35 to be displaced sufficiently to remove the stud extremities 32—33 from the recesses 40—41 and 42—43 without requiring the retainer plate 51 to be loosened during the setting and re-setting of the jaw plate 15. This avoids a source of annoyance that would result from the indexing studs 34—35 being accidentally lost during the re-setting of the plate 15 and the jaw 20 thereon.

This simple and effective self-centering jaw adjustment is accurate, dependable, and very effective for clamping pipe in conjunction with the threaded jaw member 24 for secure fastening thereof in true axial alignment with the thread cutting chasers which are mounted in the relatively rotatable portion of the threader that forms no part of the present invention, but is illustrated in connection therewith as a useful application of the clamping structure comprising the present invention.

The pipe clamping bore 11 communicates with a somewhat enlarged chamber 54 in axial alignment therewith within the body 10 to merge in an internally threaded bore 55 in a collar portion 56 comprising an integral axial tubular extension of the circular body 10. The internal threads 55 of the body collar 56 possess a pitch preferably corresponding with the pitch of the threads that are standard for pipes within the diameter range for which the clamping bore 11 is sized.

For instance, threads for pipes ranging between one and two inches in diameter customarily have eleven and one-half threads per inch so that the internal threaded bore 55 is correspondingly threaded to control the linear movement of a die holder 57 comprising, in this instance, a substantially cylindrically shaped body (Figure 1) having a tubular cylindrical sleeve 58 formed integral therewith to extend axially inwardly to provide external threads 59 meshing with the internal threads 55 of the collar 56. This permits the threaded connection between the sleeve 58 of the die holder 57 and the corresponding internally threaded collar 56 of the pipe clamping casing portion of the body 10.

The die holder 57 has the tubular sleeve 58 providing a diameter somewhat larger than the die clamping bore 11 to avoid any possible contact with the pipe extending therethrough to terminate proximate to thread cutting dies or chasers 60, in this instance four. The cutting dies or chasers 60 are detachably associated with correspondingly shaped radial guide troughs provided in the die holder 57 for linear and rotary movement therewith.

A chaser cam plate 62 complemental to the inward face 63 of the die holder 57 is detachably associated therewith for relative rotation therewith. The retainer plate 62 overlaps the die holder troughs 61 and a convolute shaped cam thread 63 therein registers with cross-slots 64 in the thread cutting chasers 60 (Figure 3), to provide for the radial displacement thereof responsive to the rotation of the retainer chaser cam plate 62. An adjusting trip 65 is anchored to the retainer cam chaser plate 62 to confront a calibrated periphery 66 of the die holder 57 (Figure 1). This sets the chasers 61 for the desired pipe size to be threaded at which position a thumb stud 67 threaded into the die holder 57 (Figure 1) is fastened to hold the element in adjusted position.

Rotation of the die holder 57 with the chasers 61 therein is effected through a plurality of pins 68, in this instance four, that are suitably anchored as at 69 in the face or cover plate 70 of an external annular spur gear 71 which has an enlarged peripheral flange 72. The gear 71 is provided with an axial bore 73 of somewhat greater diameter than the confronting annular track 74 provided on the casing collar 56. The annular track 74 on the collar 56 has a peripheral shoulder 75 which has spur teeth cut therein in diametrical alignment with the spur teeth of the ring gear 71, these being in spaced relation to receive a roller bearing 76 therebetween.

The lower bearing raceway 76 is interposed between the external annular spur gears 71 and 75 comprising part of the cover plate 70 and the housing body 10, respectively, which are operatively connected through confronting pairs of spur pinions 77—78 and 79—80 that are diametrically disposed for constant meshing engagement with the external ring gears 71—75. The confronting pairs of pinions 77—78 and 79—80 are interconnected by means of stub shafts 81—82 that are disposed to align the bores 83—84 provided in the plurality of laminated rotor plates 85 comprising part of a built-in electric motor. The laminated rotor plates 85 are connected together by a plurality of circumferentially spaced rivets 86 which cause the rotor 85 to rotate as a unit round the roller bearing raceway 76 with the confronting pairs of gears 77—78 and 79—80 rotating therewith as well as on their own stub shaft 81—82 in meshing engagement with the external ring gears 71—75. The laminated rotors 85 confront circumferentially spaced electrically wound stator poles 87 which are fixed to a circular cover plate 88 anchored by means of circumferentially spaced fasteners 89 in the housing or circular body 10 (Figure 4).

The circular cover plate 88 has an inwardly circumferentially curved end 90 which overhangs the peripheral flange 72 of the annular spur gear plate 70 to enclose a built-in electric motor to be presently described. A retainer ring 91 is fastened as at 92 to the end of the collar 54 in order to maintain the ring gear cover 70 in assembled association with the other instrumentalities so that gear 71 will be in meshing alignment with the pinions 77—79.

The electric motor consists, in this instance, of the laminated rotor 85 and the correspondingly laminated and electrically wound stator 87. With this arrangement, the built-in electric motor 85—87 rotates the confronting pairs of spur pinions 77—78 and 79—80 around a circular path and simultaneously about their axial shaft 81—82. In the present embodiment, the spur pinions 77—78 and 79—80 have, by way of example, 30 teeth therein which mesh with a 60-tooth external ring gear 75 and a 59-tooth ring gear 71 to slowly rotate the die holder 57 that, in turn, rotates the sleeve 58. The sleeve 58 has its threads 59 in meshing engagement with the threads 55 provided on the ring gear collar 56 that is driven by its integral gear 75. It should be noted that the external ring gear 71 will be of slightly smaller diameter than the external ring gear 75 which, in the present embodiment, has one more tooth than the external ring gear 71 so that the latter will rotate somewhat behind the external ring gear 75 to provide relative rotation therebetween, with the electromotive rotor 85 and stator 87 being energized, the die holder 57 with its thread cutting chasers 61 will move inwardly as it slowly rotates for cutting threads on the external circumference of a pipe held thereagainst by the clamping jaws 22—23—24. This relative rotation effects the inward linear displacement of the die holder sleeve 58 which is threaded to correspond with the pitch of the threads provided on the chasers 61 so that corresponding threads will be cut on the pipe.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction gears including spaced spur gears in said casing and operatively connected to said die holder and said casing respectively, electromotive stator and rotor disposed in said casing, and relatively movable gears in said casing for meshing engagement with said reduction gears to rotate said die holder responsive to the energization of said electromotive stator and rotor.

2. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction ring gears parallel spaced in said casing and operatively connected to said die holder and said casing respectively, electromotive stator and rotor disposed in said casing, and relatively movable gears in said casing carried by said electromotive rotor for meshing engagement with said reduction ring gears to rotate said die holder responsive to the energization of said electromotive stator and rotor.

3. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction gears operatively connected to said die holder and said casing respectively, one of said last named gears comprising an end plate for said casing, electromotive stator and rotor disposed in said casing and relatively movable gears in said casing for meshing engagement with said reduction gears to rotate said die holder responsive to the energization of said electromotive stator and rotor.

4. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction ring gears operatively connected to said die holder and said casing respectively, electromotive stator and rotor disposed in said casing, one of said reduction ring gears comprising a casing and closure plate for support of said die holder, and gears rotatively mounted on and carried by said electromotive rotor for meshing engagement with said reduction ring gears to rotate said die holder responsive to the energization of said electromotive stator and rotor.

5. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction ring gears operatively connected to said die holder and said casing respectively, electromotive stator and rotor disposed in said casing, and relatively movable gears journalled on said electromotive rotor for meshing engagement with said reduction ring gears to rotate said die holder responsive to the energization of said electromotive stator and rotor.

6. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction gears operatively connected to said die holder and said casing respectively, electromotive stator and rotor disposed in said casing between said reduction gears, and confronting pairs of pinions on each side of said electromotive rotor for meshing engagement with said reduction gears to rotate and axially displace said die holder responsive to the rotation of said electromotive rotor.

7. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction gears operatively connected to said die holder and said casing respectively, electromotive stator and rotor disposed in said casing between said reduction gears, and confronting pairs of pinions on each side of said electromotive rotor, stub shafts journalled in said electromotive rotor and connecting said confronting pairs of pinions for meshing engagement with said reduction gears to rotate and axially displace said die holder responsive to the rotation of said electromotive rotor.

8. In a power pipe threading machine, the combination with a pipe clamping casing having a pipe receiving bore therein, of a die holder carrying thread cutting chasers therein, means for threadedly connecting said die holder to said clamping casing to move axially relative thereto responsive to the rotation of said die holder, reduction gears operatively connected to said die holder and said casing respectively, electromotive stator and rotor disposed in said casing between said reduction gears, a roller bearing raceway disposed between said electromotive rotor and said pipe receiving bore in said casing, and diametrically disposed confronting pairs of pinions on each side of said electromotive rotor, stub shafts journalled in said electromotive rotor and connecting said confronting pairs of pinions for meshing engagement with said reduction gears to rotate and axially displace said die holder responsive to the rotation of said electromotive rotor.

9. In a self-contained power pipe threading machine, the combination with a pipe clamping casing having a pipe receiving bore therein, of a die holder carrying thread cutting chasers therein, complemental tubular axially disposed means for threadedly connecting said die holder to said clamping casing to move axially relative thereto responsive to the rotation of said die holder, spaced ring gears in said casing, one of said ring gears being integral with said casing, the other of said ring gears having an end plate for operative connection with said die holder to rotate therewith, an electromotive stator and rotor enveloping said complemental tubular axially disposed means, and gears journalled in said electromotive rotor for meshing engagement with said spaced ring gears to rotate said die holder responsive to the relative rotation between said electromotive rotor and stator.

10. In a self-contained power pipe threading machine, the combination with a pipe clamping casing having a pipe receiving bore therein, of a die holder carrying thread cutting chasers therein, complemental tubular axially disposed means for threadedly connecting said die holder to said clamping casing to move axially relative thereto responsive to the rotation of said die holder, spaced ring gears in said casing, one of said ring gears being integral with said casing, the other of said ring gears having an end plate for operative connection with said die holder to rotate therewith, an electromotive stator and rotor enveloping said complemental tubular axially disposed means, and stub shafts extending through and journalled in said electromotive rotor, pinions carried by said stub shafts for meshing engagement with said spaced ring gears to rotate said die holder responsive to the relative rotation between said electromotive rotor and stator.

11. In a self-contained power pipe threading machine, the combination with a pipe clamping casing having a pipe receiving bore therein, of a die holder carrying thread cutting chasers therein, complemental tubular axially disposed means for threadedly connecting said die holder to said clamping casing to move axially relative thereto responsive to the rotation of said die holder, spaced ring gears in said casing, one of said ring gears being integral with said casing, the other of said ring gears having an end plate for operative connection with said die holder to rotate therewith, an electromotive stator and rotor enveloping said complemental tubular axially disposed means, and diametrically disposed stub shafts extending through and journalled in said electromotive rotor, pinions carried at each end of said stub shafts for meshing engagement with said spaced ring gears to rotate said die holder responsive to the relative rotation between said electromotive rotor and stator.

12. In a self-contained power pipe threading machine, the combination with a pipe clamping casing having a pipe receiving bore therein, of a die holder carrying thread cutting chasers therein, a camming plate carried by said die holder to engage said thread cutting chasers to adjust the position thereof to correspond with the size of pipe in said pipe receiving bore, complemental tubular axially disposed means for threadedly connecting said die holder to said clamping casing to move axially relative thereto responsive to the rotation of said die holder, spaced ring gears in said casing, one of said ring gears being integral with said casing, the other of said external ring gears having an end plate for operative connection with said die holder to rotate therewith, an electromotive stator and rotor enveloping said complemental tubular axially disposed means, and diametrically disposed stub shafts extending through and journalled in said electromotive rotor, and pinions carried at each end of said stub shafts for meshing engagement with said spaced ring gears to rotate said die holder responsive to the relative rotation between said electromotive rotor and stator.

ALFRED T. HUTCHINSON.

REFERENCES CITED

The following references are of record in the file of this patent:

UNITED STATES PATENTS

| Number | Name | Date |
|---|---|---|
| 1,789,412 | Oster et al. | Jan. 20, 1931 |
| 1,969,854 | Pealer et al. | Aug. 14, 1934 |
| 2,374,176 | Cook | Apr. 24, 1945 |
| 2,441,111 | Delaplace | May 4, 1948 |
| 2,450,290 | Maxwell | Sept. 28, 1948 |